United States Patent
Shilling

(10) Patent No.: US 8,928,188 B2
(45) Date of Patent: Jan. 6, 2015

(54) EARTH LEAKAGE POWER SUPPLY WITH BYPASS

(75) Inventor: David Christopher Shilling, Cleveland, OH (US)

(73) Assignee: General Electric Company, Schenectady, NY (US)

( * ) Notice: Subject to any disclaimer, the term of this patent is extended or adjusted under 35 U.S.C. 154(b) by 551 days.

(21) Appl. No.: 13/288,429

(22) Filed: Nov. 3, 2011

(65) Prior Publication Data

US 2013/0113453 A1    May 9, 2013

(51) Int. Cl.
| | |
|---|---|
| *H01H 47/00* | (2006.01) |
| *H01H 35/00* | (2006.01) |
| *H01H 83/18* | (2006.01) |
| *H02H 3/02* | (2006.01) |
| *H02H 3/42* | (2006.01) |
| *H05B 33/08* | (2006.01) |

(52) U.S. Cl.
CPC ........ *H05B 33/0815* (2013.01); *H05B 33/0884* (2013.01)
USPC ........... 307/126; 307/140; 315/291; 315/307; 700/295; 700/297

(58) Field of Classification Search
USPC .................................................. 307/126, 140
See application file for complete search history.

(56) References Cited

U.S. PATENT DOCUMENTS

| | | | |
|---|---|---|---|
| 4,874,962 A | 10/1989 | Hermans | |
| 4,876,498 A | 10/1989 | Luchaco et al. | |
| 5,786,644 A | 7/1998 | Zaretsky | |
| 5,872,429 A | 2/1999 | Xia et al. | |
| 5,907,198 A | 5/1999 | Lech | |
| 6,307,354 B1 | 10/2001 | Nishihira et al. | |
| 7,546,473 B2 | 6/2009 | Newman | |
| 7,609,007 B1 | 10/2009 | Kumar | |
| 7,834,560 B2 * | 11/2010 | Ostrovsky et al. | ............ 315/291 |
| 7,868,561 B2 | 1/2011 | Weightman et al. | |
| 7,928,663 B1 | 4/2011 | Kumar | |
| 2006/0250093 A1 | 11/2006 | Kumar | |
| 2007/0057641 A1 | 3/2007 | Russell et al. | |
| 2011/0121752 A1 | 5/2011 | Newman, Jr. et al. | |

OTHER PUBLICATIONS

2474D—Smarthome Insteon 2 Wire Dimmer Switch Kit. <http://www.aartech.ca/2474d-smarthome-insteon-2-wire-dimmer-switch-kit.html>, retrieved Nov. 2011.

(Continued)

*Primary Examiner* — Rexford Barnie
*Assistant Examiner* — Toan Vu
(74) *Attorney, Agent, or Firm* — Pearne & Gordon LLP

(57) ABSTRACT

A power supply circuit for a remote load and a local controller includes a line connection receiving electrical power from an AC source. A load connection connects to the remote load. A switch is located between the line and load connections. Power is supplied to the load from the AC source through the switch. The switch is selectively opened and closed by the controller. A low voltage supply portion supplies power from the AC source to the controller. The low voltage supply portion includes an energy storage device for storing electrical energy for the controller. A current-limited earth ground portion conducts charging current from the energy storage device to earth and prevents charging current conducted to earth from exceeding a predetermined current level. An earth ground bypass portion conducts at least some of the charging current to the load when the switch located between the line and load is open.

20 Claims, 3 Drawing Sheets

(56) References Cited

OTHER PUBLICATIONS

How to Wire Two Dimmer Switches in the Same Box. <http://www.ehow.com/how_5612815_wire-dimmer-switches-same-box.html>, retrieved Nov. 2011.

Dimmer Principles. <http://sound.westhost.com/lamps/dimmers.html>, published Sep. 15, 2008.

Duwi SingleWall Dimmer (2-wire). <http://www.martialwave.com/DUW-05458>, retrieved Nov. 2011.

* cited by examiner

EARTH LEAKAGE POWER SUPPLY WITH BYPASS

BACKGROUND OF THE INVENTION

1. Field of the Invention

The present disclosure relates to devices for controlling electrical power to loads, and power supplies for such devices.

2. Description of Related Art

The most conventional switch for controlling the operation of a remote load is a toggle switch that requires no control power to operate. An example of such a conventional switch is the common wall-mounted light switch. In existing construction utilizing such conventional switches, a neutral conductor from an alternating current (AC) source (e.g., from a circuit breaker panelboard) is oftentimes run to the load but not to the switch. An energized line conductor (also called a "hot" conductor, or a "phase" conductor, or simply a "line" conductor) is run from the AC source to the switch, along with a grounding conductor to ground the switch, its enclosure, conduits, etc. A load conductor is run from the switch to the load, to supply power to the load from the AC source when the switch is closed.

Some advanced electronic switches, such as certain dimmer switches, require control power. Such advanced electronic switches can be intended to replace existing conventional switches in retrofit applications. Since conventional switches may only have a line conductor, a load conductor and a grounding conductor available locally at the switch, it would be desirable for advanced electronic switches to be able to derive control power from only the available wiring (e.g., without requiring a neutral conductor to be run to the switch). If current is to be conducted to earth ground by such a switch, and an applicable industry or governing standard defines a maximum amount of current that is permitted to be conducted to earth ground, then it would be desirable to limit the current conducted to earth ground to such a level.

BRIEF SUMMARY OF THE INVENTION

In accordance with one aspect, provided is a power supply circuit for supplying electrical power to both of a remote load and a local controller. The power supply circuit includes a line connection configured to receive electrical power from an alternating current (AC) source. The AC source comprises at least an energized line, a neutral line, and an earth ground connection. A load connection of the power supply circuit is configured to connect to the remote load. A switch is located between the line connection and the load connection. Electrical power is supplied to the remote load from the AC source through the switch. The switch is selectively opened and closed by the local controller. A low voltage supply portion supplies electrical power from the AC source to the local controller. The low voltage supply portion includes an energy storage device for storing electrical energy for the local controller. A current-limited earth ground portion conducts charging current from the energy storage device to earth ground and prevents the charging current conducted to the earth ground from exceeding a predetermined current level. An earth ground bypass portion conducts at least some of the charging current from the energy storage device to the remote load when the switch located between the line connection and the load connection is open.

In accordance with another aspect, provided is a power supply circuit for supplying electrical power to both of a remote load and a local controller. The power supply circuit includes a line connection configured to receive electrical power from an alternating current (AC) source. The AC source comprises at least an energized line, a neutral line, and an earth ground connection. A load connection of the power supply circuit is configured to connect to the remote load. A switch is located between the line connection and the load connection. Electrical power is supplied to the remote load from the AC source through the switch. The local controller communicates with the remote load via digital communications transmitted through the load connection. The local controller selectively opens and closes the switch to send a data bit to the remote load. A low voltage supply portion supplies electrical power from the AC source to the local controller. The low voltage supply portion includes a capacitor for storing electrical energy for the local controller. A current-limited earth ground portion conducts capacitor charging current from the capacitor to earth ground and prevents the capacitor charging current conducted to the earth ground from exceeding a predetermined current level. An earth ground bypass portion conducts at least some of the capacitor charging current from the capacitor to the remote load when the controller sends the data bit to the remote load.

In accordance with another aspect, provided is a power supply circuit for supplying electrical power to both of a remote load and a local controller. The power supply circuit includes a line connection configured to receive electrical power from an alternating current (AC) source. The AC source comprises at least an energized line, a neutral line, and an earth ground connection. A load connection of the power supply circuit is configured to connect to the remote load. A switch is located between the line connection and the load connection. Electrical power is supplied to the remote load from the AC source through the switch. The switch is selectively opened and closed by the local controller. A low voltage supply portion supplies electrical power from the AC source to the local controller. The low voltage supply portion includes an energy storage device for storing electrical energy for the local controller. A current-limited earth ground portion conducts charging current from the energy storage device to earth ground and prevents the charging current conducted to the earth ground from exceeding a predetermined current level. An earth ground bypass portion conducts some of the charging current from the energy storage device to the remote load at the same time as the current-limited earth ground portion conducts charging current to ground, when the switch located between the line connection and the load connection is open.

DETAILED DESCRIPTION OF THE INVENTION

Figure 1:
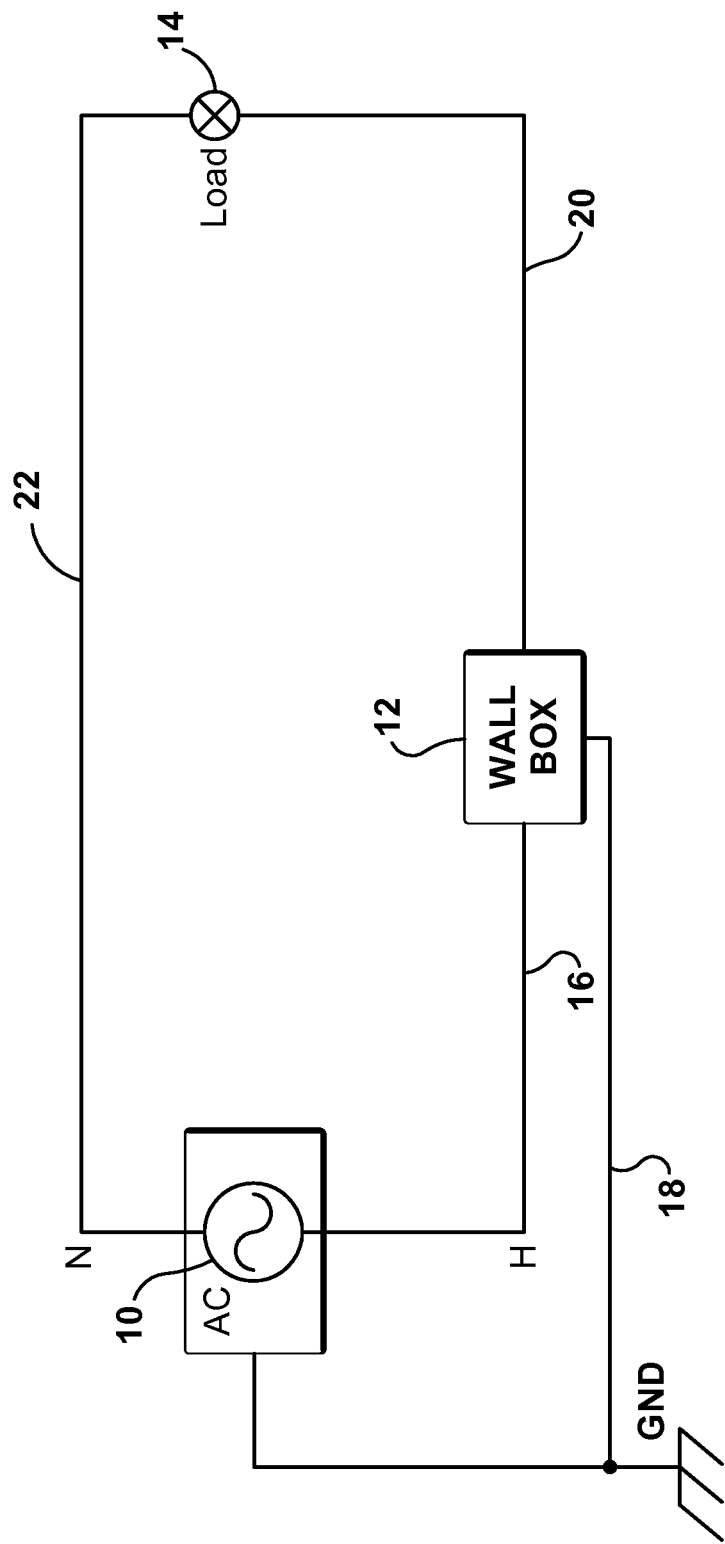
FIG. 1 is a schematic diagram of a power circuit.

FIG. 1 shows a typical existing installation including an AC source 10, a wall box 12, and a load 14. Example AC sources include circuit breaker panelboards, switchboards, fuse boxes, and the like. The AC source can provide single phase power, or multi-phase (e.g., three phase) power. The AC source includes a connection to earth ground. A neutral conductor of the AC source can be, but need not be, connected to earth ground at the AC source.

It is to be appreciated that the term "wall box" is used for convenience in describing aspects of example embodiments in terms of familiar installations and applications (such as with respect to controlling lighting loads), and that the wall box 12 need not actually be mounted on or within a wall.

A switch (not shown) is located in the wall box 12 for controlling power to the load 14. One or more energized line or phase conductors 16 extend from the AC source 10 to the wall box 12. A grounding conductor 18 also extends from the AC source 10 to the wall box 12. The wall box 12 and/or a switch within the wall box can be connected to earth ground using the grounding conductor 18.

A load conductor 20 extends from the switch to the load 14, to supply power from the AC source 10 to the load 14 when the switch is closed. A neutral conductor 22 extends from the load 14 to the AC source 10 to complete the power circuit for the load. Example loads include light fixtures, motors, fans, appliances, electronic devices, etc.

The following description refers to the load 14 as a "remote load" because the load is located at a distance from the switch or wall box (e.g., at a ceiling above the wall box). The switch can have an associated a local controller 24 (see FIG. 2) colocated at the switch 26 or wall box, for controlling various operations of the switch. The switch and local controller can form a part of a an electronic light switch, an occupancy sensor (e.g., infrared, ultrasonic, etc.), a dimmer switch, a color-selection switch, an electronic thermostat (e.g., for controlling a fan), and the like.

The local controller 24 can include a microcontroller or microprocessor for executing programmed instructions to perform the functions ascribed to the local controller as discussed herein. The local controller 24 can include integrated circuitry, such as an application specific integrated circuit (ASIC) and/or discrete circuitry for performing the functions ascribed to it.

Figure 2:
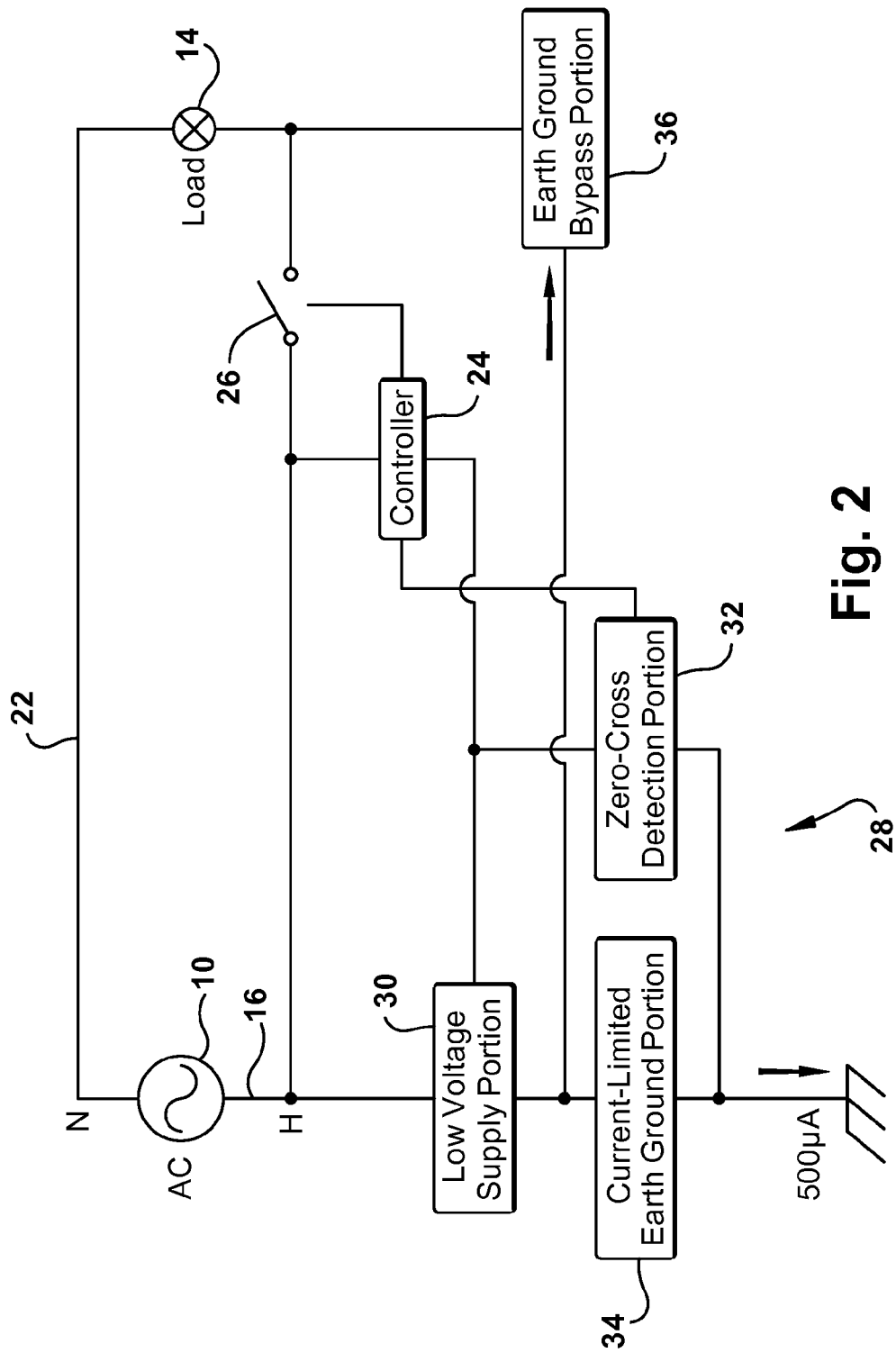
FIG. 2 is a schematic diagram of a power circuit including a block diagram representation of a power supply circuit.

A power supply circuit 28 for supplying electrical power to both the remote load 14 and the local controller 24 is shown schematically in block diagram form in FIG. 2. As described in detail below, the power supply circuit 28 operates from connections to the line, load and earth ground, and does not need a connection to a neutral conductor 22 to operate. Thus, the power supply circuit 28 can be useful in retrofit applications in which an existing switch is to be replaced with a device that requires control power, and there is no neutral conductor at the existing switch.

The power supply circuit 28 includes a low voltage supply portion 30 that stores electrical energy and regulates one or more low voltage levels for powering the controller 24 and/or other components of the power supply circuit. For example, the low voltage supply portion 30 can provide operating power, such as 5V, to the local controller 24. The low voltage supply portion 30 can regulate its one or more output voltage levels, so that they remain relatively stable. The low voltage supply portion 30 includes one or more energy storage devices for storing electrical energy. Example energy storage devices include capacitors (see FIG. 3), inductors, batteries, and the like, and combinations thereof.

The switch 26 is located between the line conductor 16 and the load conductor 20 (FIG. 1). Electrical power is supplied to the remote load 14 from the AC source 10 through the switch 26. Operations of the switch 26 are controlled by the local controller 24, which can selectively open and close the switch, thereby controlling the electrical power supplied to the remote load 14.

In certain embodiments, the local controller 24 can communicate with the remote load 14 digitally by opening and closing the switch 26. For example, the local controller 24 can open and close the switch 26 during a portion of an AC cycle from the AC source, such as within a quarter cycle or less. The remote load 14 sees a power interruption while the switch 26 is open during the portion of the AC cycle and interprets the power interruption as a data bit, such a logical 1. The local controller 24 can form complete digital messages for the remote load 14 through a series of controlled operations of the switch 26. An example message is an instruction to operate at a specific power or output level, such as a specific light level. In certain embodiments, the remote load 14 can send reply messages to the local controller 24.

The power supply circuit 28 can include a zero-cross detection portion 32 that generates an output signal that is monitored by the local controller 24. The output signal of the zero-cross detection portion 32 tells the local controller when the AC waveform is at a zero-crossing. The local controller 24 can control operations of the switch 26 based on the zero-crossing of the AC waveform. For example, the local controller 24 can time switch openings to the zero-crossing of the AC waveform, to reduce arcing during switching. Also, digital communications with the remote load 14 can be synchronized with respect to the zero-crossing.

The power supply circuit 28 includes a current-limited earth ground portion 34. The current-limited earth ground portion 34 can rectify an AC signal in the power supply circuit 28, and provides a current-limited connection to earth ground as an alternative current return path (i.e., alternative to using a neutral conductor). The current-limited earth ground portion 34 is connected to earth ground and conducts current from the low voltage supply portion 30 to earth ground. The current-limited earth ground portion 34 limits the current conducted to earth ground to a predetermined level or less, such as 500 µA. The current conducted to earth ground is also called leakage current. The current-limited earth ground portion 34 can limit the leakage current so that it does not exceed a predetermined level. The predetermined level can be defined by an industry certification standard or by adopted governing standards as enforced by an authority having jurisdiction over an installation.

The power supply circuit 28 further includes an earth ground bypass portion 36. As noted above, the current-limited earth ground portion 34 conducts current from the low voltage supply portion 30 to earth ground. The earth ground bypass portion 36 conducts current from the low voltage supply portion 30 to the load 14. Thus, the power supply circuit 28 provides dual paths for conducting current from the low voltage supply portion 30. One path, through the current-limited earth ground portion 34, conducts current from the low voltage supply portion 30 through earth ground to the AC source. The other path, through the earth ground bypass portion 36, conducts current from the low voltage supply portion 30 through the load 14 and over the neutral conductor 22 to the AC source. As discussed below, the earth ground bypass portion 36 can conduct higher levels of current than the current-limited earth ground portion 34 and can operate while the switch 26 is open.

In certain embodiments, the load 14 is specifically configured for conducting current from the power supply circuit 28, such as from the earth ground bypass portion 36, to the neutral conductor 22 while the switch 26 is open.

Figure 3:
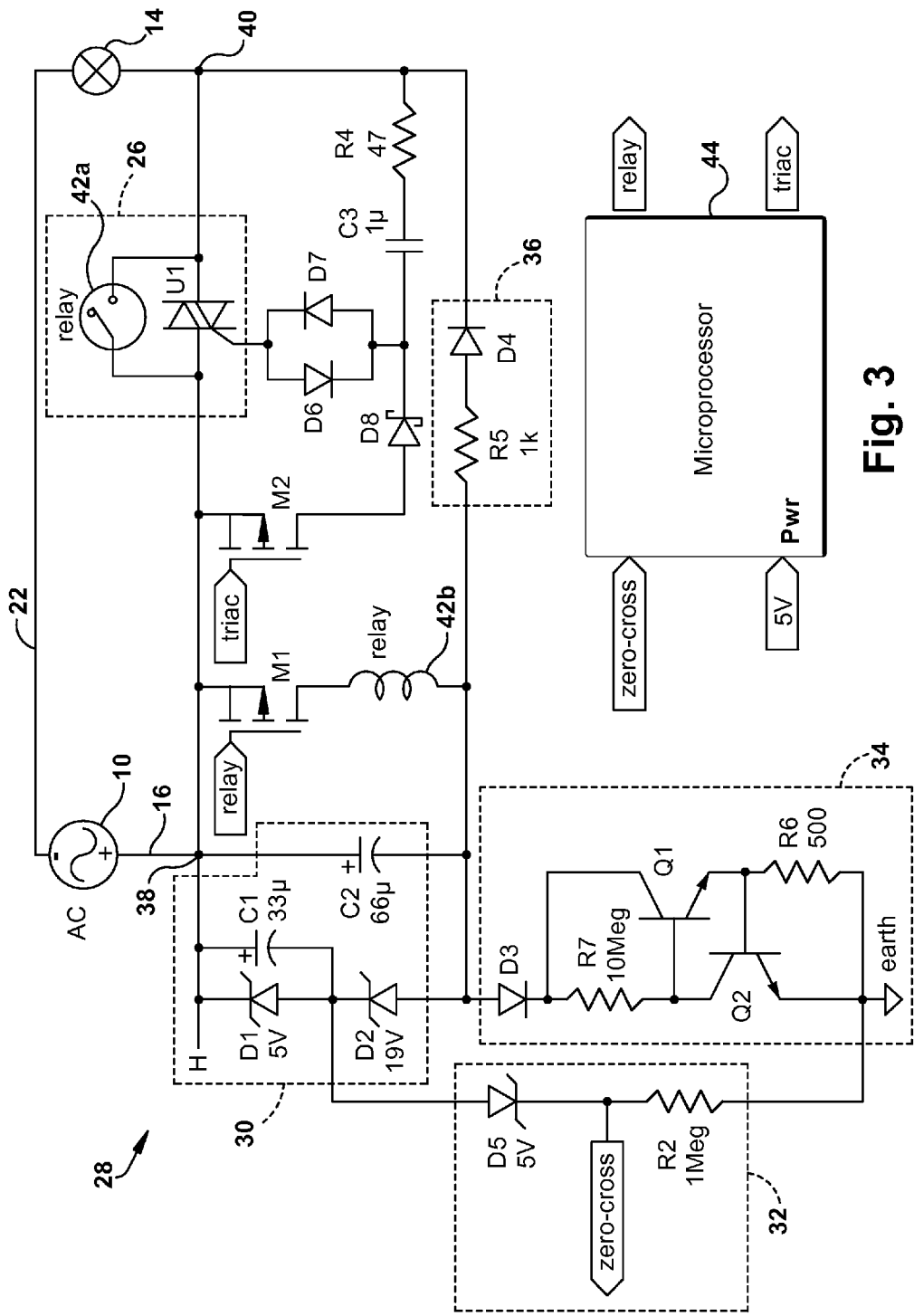
FIG. 3 is a schematic diagram of the power supply circuit.

A schematic diagram of the power supply circuit is provided in FIG. 3. A line connection 38 connects the power supply circuit 28 to the AC source 10. A load connection 40 connects the power supply circuit to the remote load 14.

The switch 26 is located between the line connection 38 and the load connection 40. The switch could be a single switching device, such as a relay or solid state switch (e.g., transistor, triac, etc.) However, in FIG. 3, the switch 26 includes two switches in parallel. A relay 42a, 42b provides switched relay contacts between the line connection 38 and the load connection 40, and a triac U1 is paralleled with the relay 42a. Operations of the relay 42a and triac U1 are controlled by a microprocessor 44, which is part of the controller 24 (see FIG. 2). The relay contacts between the line connection 38 and the load connection 40 can be normally closed contacts that are opened when the relay is energized. Thus, the normal state of switch 26 can be closed. Although two paralleled switches are shown in FIG. 3, the switch 26 can include additional switching devices located in parallel or in series.

A reason for paralleling the relay 42a and the triac U1 is that the triac operates more quickly than the relay 42a. For example, when the microprocessor 44 opens and closes the switch 26 to send a message to the load, it can first open the relay 42a and then operate the triac u1 quickly. When power is simply being supplied to the load 14 without communications from the microprocessor 44, the relay can remain closed, thereby bypassing the triac U1.

As schematically shown in FIG. 3, a relay output from the microprocessor 44 controls operations of field-effect transistor (FET) M1. Transistor M1 allows the coil of the relay 42b to be energized, to actuate the relay contacts 42a. Similarly, a triac output from the microprocessor 44 controls operations of FET M2 for operating the triac U1. Circuitry for operating the triac U1 includes diodes D6-D8, capacitor C3 (e.g., 1 μF) and resistor R4 (e.g., 47Ω). When the FET M2 is open, the triac U1 is self-triggered through the action of capacitor C3 and resistor R4.

The microprocessor 44, transistors M1, M2, and the circuitry for operating the triac U1 can all be considered parts of the controller 24 (see FIG. 2).

The low voltage supply portion 30 includes Zener diodes D1 and D2 and capacitors C1 (e.g., 33 μF) and C2 (e.g., 66 μF). The capacitors store electrical energy for powering the microprocessor 44 and other components of the power supply circuit 28 (e.g., the coil of the relay 42b). The capacitors are an example energy storage device (e.g., capacitors, inductors, batteries, etc.) for use in the low voltage supply portion 30. Zener diode D1 is electrically in parallel with capacitor C1, and they are both connected between the line connection 38 and Zener diode D2. Capacitor C2 is connected from the line connection 38 across both Zener diodes D1, D2. The Zener diodes D1, D2 regulate the voltage levels provided by the low voltage supply portion 30 by clamping voltages across the capacitors C1, C2. Zener diode D1 clamps the voltage across capacitor C1, and both Zener diodes clamp the voltage across capacitor C2. Thus, the low voltage supply portion 30 can supply electrical power at plurality of voltage levels. In FIG. 3, the voltage across capacitor C1 is 5V (e.g., for powering the microprocessor) and the voltage across capacitor C2 is 24V (e.g., for powering the coil of the relay 42b). It is to be appreciated that the low voltage supply portion 30 can be configured to provide a number of different voltage levels using various numbers of energy storage devices (e.g., one capacitor, two capacitors as shown, three capacitors, more than three capacitors, etc.) Further, energy storage devices can be configured to supply different voltage levels or identical voltage levels, which can be connected so as to provide different voltage levels. For example, two energy storage devices providing 5V each can be connected in series to provide both a 5V level and a 10V level.

Capacitor charging current from the capacitors C1, C2 is conducted to earth ground through the current-limited earth ground portion 34 of the power supply circuit 28. In the embodiment of FIG. 3, the current-limited earth ground portion 34 includes a rectifier diode D3 that blocks current from flowing backwards through the current-limited earth ground portion 34 during the negative half-cycle of the AC waveform from the AC source. The rectifier diode D3 also causes a DC current to flow through the Zener diodes D1, D2 to charge the capacitors C1, C2 of the low voltage supply portion 30. Bipolar junction transistors (BJTs) Q1, Q2 and resistors R6 (e.g., 500Ω) and R7 (e.g., 10 MΩ) form a current limiter that prevents the capacitor charging current that is conducted to earth ground from exceeding a predetermined level, such as 500 μA. The predetermined level is set by the value of resistor R6.

The earth ground bypass portion 36 also conducts capacitor charging current from the capacitors C1, C2, when the switch 26 is open. The earth ground bypass portion 36 can also conduct current for energizing the coil of the relay 42b. The earth ground bypass portion 36, when conducting the capacitor charging current, can conduct some of the capacitor charging current or all of the capacitor charging current. The earth ground bypass portion 36 includes a resistor R5 (e.g., 1 kΩ) for limiting the current level through the earth ground bypass portion 36, and a diode D4 for blocking reverse current flow in the earth ground by pass portion from the remote load.

Under normal conditions, such as when the relay 42a is closed, the low voltage supply portion 30 does not need to supply much power (e.g., to the local controller), and all of the capacitor charging current from the low voltage supply portion 30 can be conducted to earth ground through the current-limited earth ground portion 34. However, only a small amount of current (e.g., 500 μA) can be conducted to earth ground through the through the current-limited earth ground portion 34. The earth ground bypass portion 36 is not so limited and acts as a bypass around the current-limited earth ground portion 34 when additional power is required from the low voltage supply portion 30.

Additional power might be required from the low voltage supply portion 30 when the microprocessor 44 opens the switch 26. For example, when the microprocessor 44 sends a data bit to the remote load 14, the microprocessor 44 will energize the relay 42a, 42b to open the relay contacts and then signal the triac U1 to "open" and "close." The act of opening the switch 26 requires more power from the low voltage supply portion 30 than under normal conditions. When the switch 26 is open, the full AC line voltage will develop across the switch. Thus, current can flow through the earth ground bypass portion 36 when the switch 26 is open, precisely when additional power is needed from the low voltage supply portion 30. Such additional power draw might cause the capacitor charging current to exceed the capacity of the current-limited earth ground portion 34. In this case, the excess capacitor charging current can flow through the earth ground bypass portion 36 to the remote load 14 and over the neutral conductor 22 to the AC source. For example, when the microprocessor 44 sends a data bit to the remote load 14 by opening the switch 26, capacitor charging current from the low voltage supply portion 30 can be conducted to the remote load 14 through the earth ground bypass portion 36.

The power supply circuit 28 can be thought of as being "self-regenerating" in the sense that the energy used in opening the switch 26 is restored through the addition of a current path (via the earth ground bypass portion 36) to the remote load 14 and the neutral conductor 22. Thus, the action of opening the switch 26 also opens a secondary current path to the power supply circuit 28 through the earth ground bypass portion 36, the remote load 14, and the neutral conductor 22.

The zero-cross detection portion 32 includes Zener diode D5 and resistor R2 (e.g., 1 MΩ). The voltage across Zener diode D5 is monitored by the microprocessor 44. The microprocessor 44 recognizes a zero-crossing of the AC cycle from the AC source 10 from the voltage across Zener diode D5.

Although the current-limited earth ground portion 34 is shown and described as conducting current to earth ground, it could be configured to conduct current to a neutral conductor.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A power supply circuit for supplying electrical power to both of a remote load and a local controller, the power supply circuit comprising:
    a line connection configured to receive electrical power from an alternating current (AC) source, wherein the AC source comprises at least an energized line, a neutral line, and an earth ground connection;
    a load connection configured to connect to the remote load;
    a switch located between the line connection and the load connection and through which electrical power is supplied to the remote load from the AC source, wherein the switch is selectively opened and closed by the local controller;
    a low voltage supply portion for supplying electrical power from the AC source to the local controller, the low voltage supply portion including an energy storage device for storing electrical energy for the local controller;
    a current-limited earth ground portion configured to conduct charging current from the energy storage device to earth ground and prevent the charging current conducted to the earth ground from exceeding a predetermined current level; and
    an earth ground bypass portion configured to conduct at least some of the charging current from the energy storage device to the remote load when the switch located between the line connection and the load connection is open.

2. The power supply circuit of claim 1, wherein the energy storage device comprises a first capacitor and a second capacitor,
    wherein the low voltage supply portion is configured for supplying electrical power at plurality of voltage levels;
    wherein the current-limited earth ground portion is configured to conduct capacitor charging current from both of the first and second capacitors to earth ground; and
    wherein the earth ground bypass portion is configured to conduct at least some of the capacitor charging current from both of the first and second capacitors to the remote load when the switch located between the line connection and the load connection is open.

3. The power supply circuit of claim 2, wherein the low voltage supply portion further comprises a first Zener diode electrically in parallel with the first capacitor, and a second Zener diode connected to the first Zener diode and the first capacitor,
    wherein the first Zener diode clamps a first voltage across the first capacitor and both of the first Zener diode and the second Zener diode together clamp a second voltage across the second capacitor.

4. The power supply circuit of claim 1, wherein the switch comprises relay contacts, located between the line connection and the load connection, and a solid state switch electrically in parallel with the relay contacts.

5. The power supply circuit of claim 1, wherein the earth ground bypass portion includes a resistor that limits the at least some of the charging current conducted to the remote load, and a diode that blocks reverse current flow in the earth ground bypass portion from the remote load.

6. The power supply circuit of claim 1, wherein the local controller communicates with the remote load via digital communications transmitted through the load connection,
    wherein the local controller selectively opens and closes the switch during a portion of an AC cycle from the AC source, to send a data bit to the remote load; and
    wherein the earth ground bypass portion is configured to conduct the at least some of the charging current from the energy storage device to the remote load when the local controller sends the data bit to the remote load.

7. The power supply circuit of claim 1, wherein the energy storage device comprises a capacitor and the charging current comprises capacitor charging current.

8. A power supply circuit for supplying electrical power to both of a remote load and a local controller, the power supply circuit comprising:
    a line connection configured to receive electrical power from an alternating current (AC) source, wherein the AC source comprises at least an energized line, a neutral line, and an earth ground connection;
    a load connection configured to connect to the remote load;
    a switch located between the line connection and the load connection and through which electrical power is supplied to the remote load from the AC source, wherein the local controller communicates with the remote load via digital communications transmitted through the load connection, and wherein the local controller selectively opens and closes the switch to send a data bit to the remote load;
    a low voltage supply portion for supplying electrical power from the AC source to the local controller, the low voltage supply portion including a capacitor for storing electrical energy for the local controller;
    a current-limited earth ground portion configured to conduct capacitor charging current from the capacitor to earth ground and prevent the capacitor charging current conducted to the earth ground from exceeding a predetermined current level; and
    an earth ground bypass portion configured to conduct at least some of the capacitor charging current from the capacitor to the remote load when the local controller sends the data bit to the remote load.

9. The power supply circuit of claim 8, wherein the capacitor is a first capacitor, and the low voltage supply portion further comprises a second capacitor,
    wherein the low voltage supply portion is configured for supplying electrical power at plurality of voltage levels;
    wherein the current-limited earth ground portion is configured to conduct capacitor charging current from both of the first and second capacitors to earth ground; and
    wherein the earth ground bypass portion is configured to conduct at least some of the capacitor charging current from both of the first and second capacitors to the remote load when the local controller sends the data bit to the remote load.

10. The power supply circuit of claim 9, wherein the low voltage supply portion further comprises a first Zener diode electrically in parallel with the first capacitor, and a second Zener diode connected to the first Zener diode and the first capacitor,
    wherein the first Zener diode clamps a first voltage across the first capacitor and both of the first Zener diode and the second Zener diode together clamp a second voltage across the second capacitor.

11. The power supply circuit of claim 8, wherein the switch comprises relay contacts, located between the line connection and the load connection, and a solid state switch electrically in parallel with the relay contacts.

12. The power supply circuit of claim 8, wherein the earth ground bypass portion includes a resistor that limits the at least some of the capacitor charging current conducted to the remote load, and a diode that blocks reverse current flow in the earth ground bypass portion from the remote load.

13. The power supply circuit of claim 8, further comprising a zero-cross detection portion including an output that is monitored by the local controller, wherein the local controller recognizes a zero-crossing of the AC cycle based the output from the zero-cross detection portion.

14. A power supply circuit for supplying electrical power to both of a remote load and a local controller, the power supply circuit comprising:
- a line connection configured to receive electrical power from an alternating current (AC) source, wherein the AC source comprises at least an energized line, a neutral line, and an earth ground connection;
- a load connection configured to connect to the remote load;
- a switch located between the line connection and the load connection and through which electrical power is supplied to the remote load from the AC source, wherein the switch is selectively opened and closed by the local controller;
- a low voltage supply portion for supplying electrical power from the AC source to the local controller, the low voltage supply portion including an energy storage device for storing electrical energy for the local controller;
- a current-limited earth ground portion configured to conduct charging current from the energy storage device to earth ground and prevent the charging current conducted to the earth ground from exceeding a predetermined current level; and
- an earth ground bypass portion configured to conduct some of the charging current from the energy storage device to the remote load at the same time as the current-limited earth ground portion conducts charging current to ground, when the switch located between the line connection and the load connection is open.

15. The power supply circuit of claim 14, wherein the energy storage device comprises a first capacitor and a second capacitor, wherein the low voltage supply portion is configured for supplying electrical power at plurality of voltage levels;

wherein the current-limited earth ground portion is configured to conduct capacitor charging current from both of the first and second capacitors to earth ground; and wherein the earth ground bypass portion is configured to conduct some of the capacitor charging current from both of the first and second capacitors to the remote load at the same time as the current-limited earth ground portion conducts capacitor charging current to ground, when the switch located between the line connection and the load connection is open.

16. The power supply circuit of claim 15, wherein the low voltage supply portion further comprises a first Zener diode electrically in parallel with the first capacitor, and a second Zener diode connected to the first Zener diode and the first capacitor, wherein the first Zener diode clamps a first voltage across the first capacitor and both of the first Zener diode and the second Zener diode together clamp a second voltage across the second capacitor.

17. The power supply circuit of claim 14, wherein the switch comprises relay contacts, located between the line connection and the load connection, and a solid state switch electrically in parallel with the relay contacts.

18. The power supply circuit of claim 14, wherein the earth ground bypass portion includes a resistor that limits the charging current conducted to the remote load, and a diode that blocks reverse current flow in the earth ground bypass portion from the remote load.

19. The power supply circuit of claim 14, wherein the local controller communicates with the remote load via digital communications transmitted through the load connection, wherein the local controller selectively opens and closes the switch during a portion of an AC cycle from the AC source, to send a data bit to the remote load; and wherein the earth ground bypass portion is configured to conduct some of the charging current from the energy storage device to the remote load when the local controller sends the data bit to the remote load.

20. The power supply circuit of claim 14, wherein the energy storage device comprises a capacitor and the charging current comprises capacitor charging current.

* * * * *